United States Patent
Vandewalle et al.

(10) Patent No.: US 9,338,424 B2
(45) Date of Patent: May 10, 2016

(54) PROCESSING DEPTH DATA OF A THREE-DIMENSIONAL SCENE

(75) Inventors: Patrick Luc Els Vandewalle, Oud-Turnhout (BE); Mathias Hubertus Godefrida Peeters, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 280 days.

(21) Appl. No.: 14/000,340

(22) PCT Filed: Feb. 16, 2012

(86) PCT No.: PCT/IB2012/050720
§ 371 (c)(1),
(2), (4) Date: Aug. 19, 2013

(87) PCT Pub. No.: WO2012/114236
PCT Pub. Date: Aug. 30, 2012

(65) Prior Publication Data
US 2013/0321571 A1    Dec. 5, 2013

(30) Foreign Application Priority Data
Feb. 23, 2011   (EP) .................................. 11155522

(51) Int. Cl.
*H04N 13/00*    (2006.01)
(52) U.S. Cl.
CPC ....... *H04N 13/0007* (2013.01); *H04N 13/0022* (2013.01); *H04N 2213/003* (2013.01)
(58) Field of Classification Search
CPC .......... H04N 13/0007; H04N 13/0022; H04N 2213/003; G06F 17/30811; G06T 7/0046
USPC .............................................. 348/42; 382/106
See application file for complete search history.

(56) References Cited

U.S. PATENT DOCUMENTS 8,761,492 B2   6/2014   Hirai et al.
8,842,730 B2   9/2014   Zhou et al.
(Continued)

FOREIGN PATENT DOCUMENTS

JP   2001320731 A   11/2001
JP   2010021844 A    1/2010
(Continued)

OTHER PUBLICATIONS

Huhle, Benjamin et al "Robust Non-Local Denoising of Colored Depth Data", Computer Vision and Pattern Recognition Workshops, 2008 IEEE. pp. 1-7.
(Continued)

*Primary Examiner* — Allen C Wong

(57) ABSTRACT

A signal processing device for processing three-dimensional image data, having two-dimensional (2D) image data and 2D depth data, includes an input for receiving the 2D image data and the 2D depth data. Further, a first outlier detector is used for establishing a statistical depth deviation of a depth value from other depth values in a first spatial neighborhood of the 2D depth data. A second outlier detector is used for establishing a statistical image deviation of an image value from other image values in a second spatial neighborhood of the 2D image data. The signal processing device also includes a depth value generator for, in dependence on the statistical depth deviation and the statistical image deviation, providing a replacement depth value when the statistical depth deviation exceeds the statistical image deviation.

20 Claims, 5 Drawing Sheets

(56) References Cited

U.S. PATENT DOCUMENTS

| | | |
|---|---|---|
| 2008/0150945 A1 | 6/2008 | Wang |
| 2008/0252659 A1 | 10/2008 | Cai |
| 2008/0253617 A1* | 10/2008 | Ernst ............... G06F 17/30811 382/106 |
| 2010/0110070 A1 | 5/2010 | Aron |
| 2010/0220893 A1* | 9/2010 | Lee ..................... G06T 7/0046 382/106 |
| 2010/0239180 A1 | 9/2010 | Anthony |

FOREIGN PATENT DOCUMENTS

| | | |
|---|---|---|
| WO | 9702397 A1 | 1/1997 |
| WO | 2007132397 A2 | 11/2007 |
| WO | 2008152607 A1 | 12/2008 |
| WO | 2009061305 A1 | 5/2009 |
| WO | 2011046607 A2 | 4/2011 |

OTHER PUBLICATIONS

Ahn, Yang-Keun et al, "Boundary-Based Depth Image Improvement", Advances in Visualization, Imaging and Simulation, Nov. 2010, pp. 64-.

Varekamp, Chris "Compression Artifacts in 3D Television Signals", IEEE Benelux/DSP Valley Signal Processing Symposium (SPS-DARTS) 2006.

Machado, Patrick F. "Depth Estimation for Stereo Content—a Motion Estimation Approach on a Trimedia Processor", Technical Report PR-TN 2005-01168, 2005.

* cited by examiner

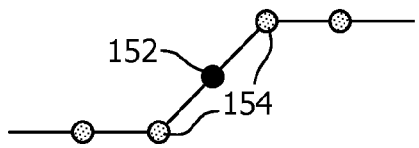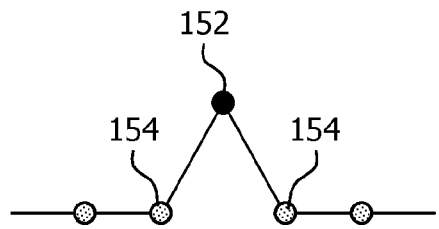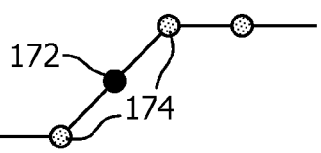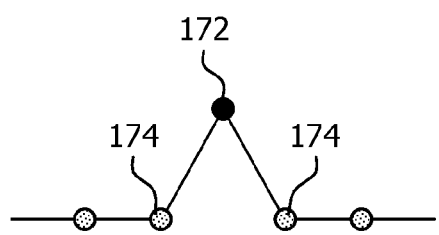
FIG. 4  FIG. 5
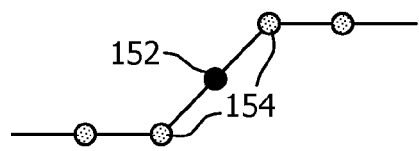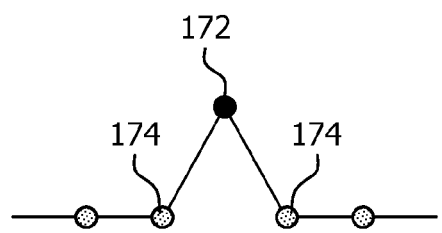
FIG. 6

PROCESSING DEPTH DATA OF A THREE-DIMENSIONAL SCENE

FIELD OF THE INVENTION

The invention relates to a signal processing device, a method and a computer program for processing three-dimensional [3D] image data, the 3D image data comprising two-dimensional [2D] image data and thereto corresponding 2D depth data.

Throughout the text, any reference to image data or depth data without an explicit indication of dimensionality will refer to 2D image data or 2D depth data, respectively. It is also noted that the term 'image data' may refer to image data of a still image or image data of a frame in a video sequence.

One of the formats for processing 3D image data is the 'image plus depth' format (also known as '2D plus depth'), where image data representing a first viewpoint of a 3D scene is accompanied by depth data comprising depth values that indicate a distance that objects within the image data have towards the camera and/or the viewer. The 'image plus depth' format typically provides an efficient way of representing a 3D scene.

For displaying a 3D scene transmitted in the 'image plus depth' format, additional image data may be needed for representing a second viewpoint of the 3D scene. The additional image data may be recreated from the input image data and the depth data at the receiver side. For this purpose, the receiver may comprise a so-termed viewpoint generator which displaces part of the input image data as a function of the depth data to generate the additional image data. Viewpoint generation is also known as depth-based image rendering. WO 1997/023097-A3 discloses an example of a depth-based image renderer.

BACKGROUND OF THE INVENTION

Depth data, for use in the 'image plus depth' format, may be imperfect. For example, the depth data may be generated by a so-termed 2D-to-3D conversion, in which the input image data is used as a basis for estimating the depth data. Such estimating may be incorrect at times, causing artifacts to appear in the depth data, which, after viewpoint generation, may cause artifacts becoming visible in the displayed 3D scene. Such artifacts may also appear when using a so-termed stereo-to-depth conversion, in which a stereo image pair is used as a basis for generating the depth data. WO 2007/132397-A2 discloses an example of a 2D-to-3D conversion process. The 2D-to-3D conversion and stereo-to-depth conversion processes are examples of depth data generation processes.

For reducing artifacts that are present in a depth map, a publication "*Boundary-Based Depth Image Improvement*" by Yang-Keun Ahn et al., in "*Advances in Visualization, Imaging and Simulation*", November 2010, discloses use of median filters to remove noise from the depth map for improving a subsequent depth-based image rendering.

SUMMARY OF THE INVENTION

A problem of the use of median filters for reducing artifacts that are present in depth data is that the reduction of artifacts is insufficient.

It is an object of the invention to provide a device, a method and a computer program for providing an improved reduction of artifacts in depth data.

According to the invention, this object is realized in that a signal processing device is provided for processing three-dimensional [3D] image data, the 3D image data comprising two-dimensional [2D] image data and thereto corresponding 2D depth data, and the signal processing device comprising an input for receiving the 2D image data and the 2D depth data, a first outlier detector for establishing a statistical depth deviation of a depth value from other depth values in a first spatial neighborhood of the 2D depth data, a second outlier detector for establishing a statistical image deviation of an image value from other image values in a second spatial neighborhood of the 2D image data, the depth value representing a depth of the image value, and a depth value generator for, in dependence on the statistical depth deviation and the statistical image deviation, providing a replacement depth value when the statistical depth deviation exceeds the statistical image deviation, the replacement depth value having a lower statistical depth deviation than the depth value.

In a further aspect of the invention, a method is provided for processing three-dimensional [3D] image data, the 3D image data comprising two-dimensional [2D] image data and thereto corresponding 2D depth data, and the method comprising receiving the 2D image data and the 2D depth data, establishing a statistical depth deviation of a depth value from other depth values in a first spatial neighborhood of the 2D depth data, establishing a statistical image deviation of an image value from other image values in a second spatial neighborhood of the 2D image data, the depth value representing a depth of the image value, and in dependence on the statistical depth deviation and the statistical image deviation, providing a replacement depth value when the statistical depth deviation exceeds the statistical image deviation, the replacement depth value having a lower statistical depth deviation than the depth value.

In a further aspect of the invention, a computer program is provided comprising instructions for causing a processor system to perform the method set forth.

The measures according to the invention provide an input for receiving 2D image data and 2D depth data. The 2D depth data corresponds to the 2D image data in that the 2D depth data comprises depth values that indicate a depth of respective image values of the 2D image data. Here, an image value is understood to be indicative of a luminance and/or chrominance. Thus, the 2D image data comprises information concerning the luminance and/or the chrominance of a 3D scene, whereas the 2D depth data comprises information concerning the depth, i.e., the distance towards a camera and/or a viewer, of the 3D scene.

A first outlier detector is provided that determines a statistical depth deviation of a depth value with respect to surrounding depth values. The depth value and the surrounding depth values are located within a same portion, i.e., neighborhood, in the 2D depth data. As such, the portion encompasses at least two depth values. The statistical depth deviation may be indicative whether the depth value is equal to a statistical mean within the portion, whether the depth value deviates from the statistical mean, to what extent the depth value deviates from the statistical mean, etc. In general, the statistical depth deviation is indicative of a difference between the depth value and the surrounding depth values.

Also, a second outlier detector is provided that determines a statistical image deviation of an image value with respect to surrounding image values. The image value and the surrounding image values are located within a same portion of the 2D image data. As such, the portion encompasses at least two image values. The statistical image deviation may be indicative whether the image value is equal to or deviates from a statistical mean within the portion. In general, the statistical image deviation is indicative of a difference between the image value and the surrounding image values. The image value corresponds to the depth value in that the depth value represents a depth of the image value. As such, the image value and the depth value may be located at corresponding locations within the 2D image data and the 2D depth data. However, due to a difference in, e.g., spatial resolutions between the 2D image data and the 2D depth data, both locations may also differ.

Moreover, a depth value generator is provided that, in dependence on the statistical depth deviation and the statistical image deviation, provides a replacement depth value for replacing the aforementioned depth value. The depth value generator provides the replacement depth value when the statistical depth deviation exceeds, i.e., is larger than, the statistical image deviation. Thus, the depth value generator uses information about a difference between the relative size of the statistical depth deviation and the statistical image deviation. The providing may comprise replacing the depth value in the depth data. The providing may also comprise providing, instead of the depth value, the replacement depth value to a further processing element, e.g., a viewpoint generator. The replacement depth value has a lower statistical depth deviation than the depth value. Thus, the replacement depth value may, e.g., be nearer to statistical mean of the other depth values.

The present invention is partially based on the recognition that an artifact in depth data may be characterized by the depth value having a statistical deviation with respect to its surroundings, and by a corresponding image value having less of such statistical deviation. In such a case, the depth value may be a depth outlier, whereas the corresponding image value is not an image outlier or may be less of an image outlier. It is uncommon that a depth value is an outlier whereas its corresponding image value is not, as depth values typically contain few textures or edges, and when such texture or edges occur, they mostly relate to texture or edges in the image data. Thus, when the depth value is more of an outlier than the corresponding image value, this may indicate an artifact in the depth data.

The inventors have also recognized that one of the causes of the aforementioned artifacts are blurred object edges within image data, as these may cause a depth data generation process to generate erroneous depth values. Blurred object edges may occur for various reasons, e.g., due to a camera being out-of-focus or an anti-aliasing filter that has been applied to the image data. It may be inherently difficult to determine whether such blurred object edges belong to the foreground or to the background, and as such, whether they should be assigned a foreground depth value or a background depth value.

Consequently, the depth data generation process may assign an erroneous depth value to the blurred object edge, i.e., generate an artifact in the depth data. Moreover, the inventors have observed that such erroneous depth values tend to deviate more from their surroundings than the blurred object edges themselves. A reason for this may be that certain assumptions of the depth data generation process used in estimating the depth value may not hold in blurred object edges, thus resulting in said erroneous depth values.

It is recognized that other causes for such erroneous depth values may be a previous application of a bilateral filter or a sharpening filter to the 2D depth data. Also, erroneous depth values may be introduced by manual editing of the 2D depth data.

The aforementioned measures of the present invention have the effect that a statistical deviation of a depth value is determined, a statistical deviation of a corresponding image value is determined, and that the depth value is replaced with a replacement depth value when the statistical deviation of the depth value exceeds the statistical deviation of the corresponding image value. The replacement depth value then reduces the statistical depth deviation and as a consequence brings the statistical depth deviation more in line with the statistical image deviation. As a consequence, erroneous depth values are replaced by less erroneous depth values, and thus artifacts in the depth data are reduced. Advantageously, after viewpoint generation, fewer artifacts are visible in the 3D scene. Advantageously, a more pleasing 3D experience is provided to a viewer of the 3D scene.

Optionally, the first outlier detector is configured for establishing the statistical depth deviation by comparing the depth value to the other depth values for establishing if the depth value is a depth outlier, the second outlier detector is configured for establishing the statistical image deviation by comparing the image value to the other image values for establishing if the image value is not an image outlier, and the depth value generator is configured for providing the replacement depth value if the depth value is a depth outlier and if the image value is not an image outlier.

The replacement depth value is thus provided when the depth value is a depth outlier, i.e., is considered to deviate sufficiently from the other depth values, and the image value is not an image outlier, i.e., is not considered to deviate sufficiently from the other image values. Consequently, the depth outlier is replaced by a value that has a lower statistical depth deviation than the depth outlier. Advantageously, depth outliers that cause artifacts in the displayed 3D scene are replaced by depth values that cause less or no artifacts.

Optionally, the first outlier detector is configured for comparing the depth value to a maximum and/or a minimum of the other depth values, and establishing that the depth value is a depth outlier when the depth value is larger than the maximum and/or smaller than the minimum of the other depth values. This provides a particularly suitable way for determining whether the depth value is a depth outlier.

Optionally, the second outlier detector is configured for comparing the image value to a maximum and/or a minimum of the other image values, and establishing that the image value is not an image outlier when the image value is smaller than the maximum and/or larger than the minimum of the other image values. This provides a particularly suitable way for determining whether the image value is not an image outlier.

Optionally, the depth value generator is configured for providing as the replacement depth value one of the other depth values in the first spatial neighborhood. By using an existing depth value, no additional depth values are introduced within the depth data. Advantageously, the depth value generator does not need to perform an actual depth data generation process, but may rather determine a suitable depth value amongst the other depth values in the first spatial neighborhood for use as replacement depth value. Advantageously, an improved reduction of artifacts in the depth data is obtained.

Optionally, the depth value generator is configured for providing as the replacement depth value a maximum and/or a minimum of the other depth values in the first spatial neighborhood. The maximum and/or the minimum value of the other depth values may correspond to a depth of the background and/or the foreground. Thus, the image value may be assigned a depth value that corresponds to the background and/or the foreground.

Optionally, the depth value generator is configured for applying a spatial filter to the first spatial neighborhood of the 2D depth data for providing as the replacement depth value a spatially filtered depth value. The spatial filtering provides a replacement depth value that is generated from existing depth values in the first spatial neighborhood. Advantageously, the depth value generator does not need to perform an actual depth data generation process, but may rather obtain the replacement depth value by spatially filtering the first spatial neighborhood. Advantageously, an improved reduction of artifacts in the depth data is obtained.

Optionally, the spatial filter is a spatial noise reduction filter for suppressing depth outliers. Spatial noise reduction filters are well suited for reducing outliers in noisy image data, and consequently, suitable for reducing depth outliers in depth data.

Optionally, the first spatial neighborhood and the second spatial neighborhood extend predominantly in a horizontal direction. A viewpoint generator will typically displace portions of the image data in a horizontal direction. Thus, artifacts will be more visible when the depth value is an outlier in a horizontal direction than when the depth value is an outlier in a vertical direction. By extending the neighborhoods predominantly horizontally, the horizontal direction is emphasized over the vertical direction. Advantageously, a vertical size of the neighborhoods may be reduced for reducing a cost of the signal processing device.

Optionally, the first spatial neighborhood comprises a horizontal line portion of the 2D depth data, and the second spatial neighborhood comprises a corresponding horizontal line portion of the 2D image data. A horizontal line portion provides a well suited trade-off between implementation cost and reduction of artifacts in the 2D depth data.

Optionally, a viewpoint generator is provided for displacing at least one part of the 2D image data as a function of the 2D depth data to generate further 2D image data, the viewpoint generator comprising the signal processing device set forth.

Optionally, a depth data generator is provided for generating the 2D depth data in dependence on the 2D image data, the depth data generator comprising the signal processing device set forth.

Optionally, the computer program set forth is embodied on a computer readable medium.

BRIEF DESCRIPTION OF THE DRAWINGS

These and other aspects of the invention are apparent from and will be elucidated with reference to the embodiments described hereinafter. In the drawings.

FIG. 4 shows an example of an image value not being an image outlier and a corresponding depth value not being a depth outlier;

FIG. 5 shows an example of an image value being an image outlier and a corresponding depth value being a depth outlier;

FIG. 6 shows an example of an image value not being an image outlier and a corresponding depth value being a depth outlier;

DETAILED DESCRIPTION OF EMBODIMENTS

It is noted that, in the previous and in the following, image data refers to a data representation of an image. The image is a visual representation of information. The image data typically comprises so-termed image values, i.e., data elements such as luminance or chrominance values of portions of the image. Alternatively, the image values may be other values that may be interpreted and thus visualized as luminance or chrominance values.

Moreover, depth data refers to a data representation of a depth of a 3D scene. The depth data typically comprises so-termed depth values, i.e., data elements that indicate a distance to a camera or to a viewer. Typically, depth data may be visualized as monochrome image data.

Although depth data typically comprises depth values, depth data may also be represented using so-termed disparity values or displacement values. Within a stereoscopic image pair, the disparity values associated with an image correspond to the apparent displacement of objects between the respective images of the stereoscopic image pair.

Technically disparity values are inversely proportional to depth values and thus both values represent a depth of a 3D scene. However, quite often parallax transforms are used to further tweak this relationship, for example to map the range of depth values in a perceptively pleasing manner to the disparity range of an auto-stereoscopic display.

Concluding, both depth values as well as disparity values are data representations of a depth of a 3D scene and thus qualify as depth data.

It will be clear to those skilled in the art that the present invention, which is demonstrated based on image data and depth data in the form of depth values, may readily be applied to image data and depth data in the form of disparity values.

Figure 1:
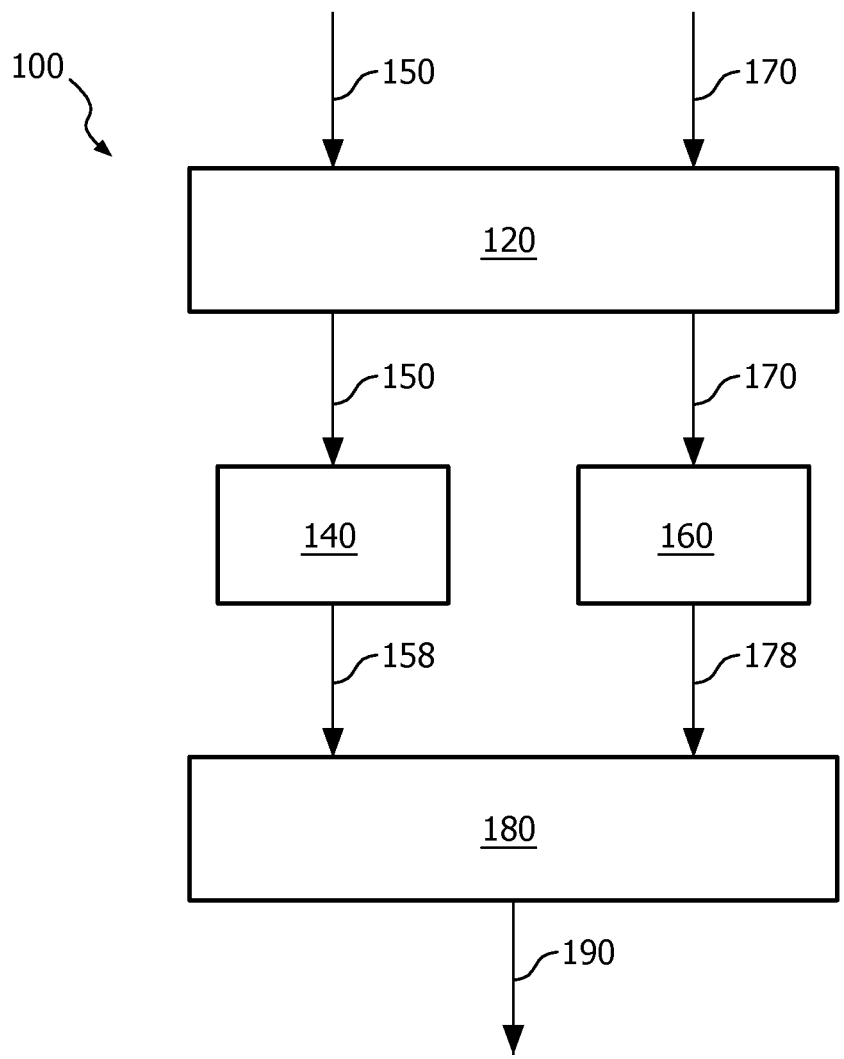
FIG. 1 shows a signal processing device for processing depth data.

FIG. 1 shows a signal processing device 100 for processing 3D image data, the 3D image data comprising 2D image data 150 and thereto corresponding 2D depth data 170. The signal processing device 100 comprises an input 120 for receiving the 2D image data 150 and the 2D depth data 170. The signal processing device 100 further comprises a first outlier detector 160 for establishing a statistical depth deviation 178 from the 2D depth data 170. For receiving the 2D depth data 170, the first outlier detector 160 is shown to be connected to the input 120. The signal processing device 100 further comprises a second outlier detector 140 for establishing a statistical image deviation 158 from the 2D image data 150. For receiving the 2D image data 150, the second outlier detector 140 is shown to be connected to the input 120. The signal processing device 100 further comprises a depth value generator 180 for, in dependence on the statistical depth deviation 178 and the statistical image deviation 158, providing a replacement depth value 190. For receiving the statistical depth deviation 178 and the statistical image deviation 158, the depth value generator 180 is shown to be connected to the first outlier detector 160 and the second outlier detector 140, respectively.

During operation of the signal processing device 100, the input 120 receives the 2D image data 150 and the 2D depth data 170. The receiving may comprise receiving said data from a remote or local storage device, receiving said data via a network connection or receiving said data from a previous signal processing device.

Figure 3:
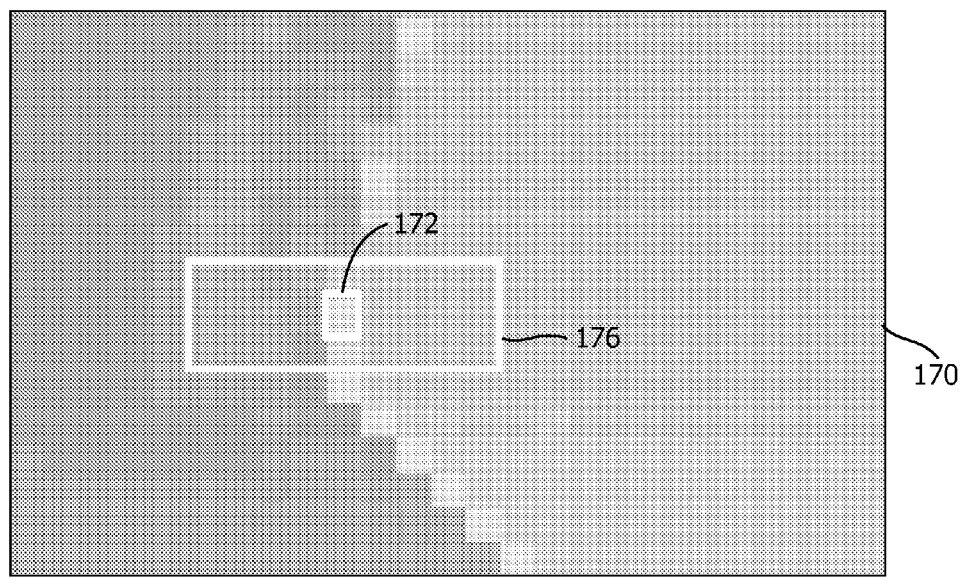
FIG. 3 shows a depth value and a spatial neighborhood in depth data.

The first outlier detector 160 receives the 2D depth data 170 to establish a statistical depth deviation 178 of a depth value 172 from other depth values 174 in a first spatial neighborhood 176 of the 2D depth data 170. An example of the 2D depth data 170 is shown in FIG. 3. Here, the 2D depth data 170 is shown as monochrome image data, in which each grey value represents a particular depth value. Also shown are the first spatial neighborhood 176 and the depth value 172. Not shown are the other depth values 174. It will be appreciated that the other depth values 174 may comprise all of the depth values in the first spatial neighborhood 176 and may exclude the depth value 172 itself. However, the other depth values 174 may also refer to a different set of depth values in said neighborhood.

Figure 2:
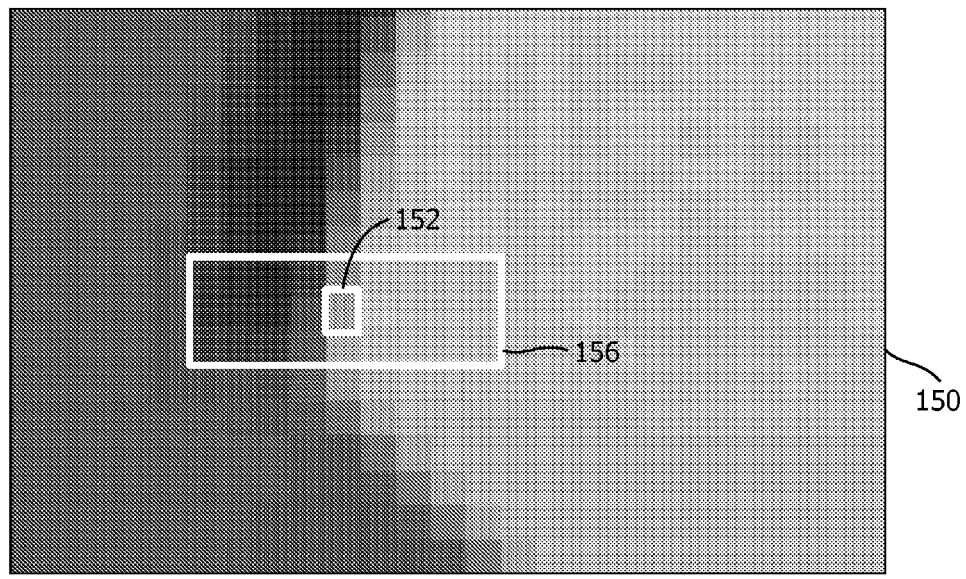
FIG. 2 shows an image value and a spatial neighborhood in image data.

The second outlier detector 140 receives the 2D image data 150 for establishing a statistical image deviation 158 of an image value 152 from other image values 154 in a second spatial neighborhood 156 of the 2D image data 150. The depth value 172 represents a depth of the image value 152. An example of the 2D image data 150 is shown in FIG. 2. Also shown are the second spatial neighborhood 156 and the image value 152. Not shown are the other image values 154. It will be appreciated that the other image values 154 may comprise all of the image values in the second spatial neighborhood 156 and may exclude the image value 152 itself. However, the other image values 154 may also refer to a different set of the image values in said neighborhood.

The depth generator 180 receives the statistical depth deviation 178 and the statistical image deviation 158 for, in dependence on said deviations, providing a replacement depth value 190 when the statistical depth deviation 178 exceeds the statistical image deviation 158. Thus, in case the depth value 172 has a relatively large statistical depth deviation 178, and the corresponding image value 152 has a relatively small statistical image deviation 158, the depth value 172 may be replaced by a replacement depth value 190.

It is noted that the statistical depth deviation 178 and the statistical image deviation 158 each relate to different types of data, and thus, that the statistical depth deviation 178 exceeding the statistical image deviation 158 may refer to a relative exceeding, i.e., one taking into account the different types of data. This allows the depth generator 180 to take into account differences in, e.g., dynamic signal range, bit-depth, etc between the 2D image data 150 and the 2D depth data 170. For that purpose, the statistical depth deviation 178 and/or the statistical image deviation 158 may be normalized deviations. Similarly, the statistical depth deviation 178 and/or the statistical image deviation 158 may be thresholded deviations, i.e., having a value of zero if the deviation is below a certain threshold, and having a value larger than zero if the deviation exceeds said threshold. Consequently, the statistical depth deviation 178 exceeding the statistical image deviation 158 may comprise the statistical depth deviation 178 exceeding a certain threshold, and the statistical image deviation 158 not exceeding the same or a different threshold.

It is further noted that providing the replacement depth value 190 may comprise providing the replacement depth value 190 as part of further 2D depth data. The further 2D depth data may comprise the depth values of the 2D depth data 170, with certain depth values having been replaced by replacement depth values having a lower statistical depth deviation. Thus, the signal processing device 100 may be arranged for providing the replacement depth value 190 when the statistical depth deviation 178 exceeds the statistical image deviation 158, and otherwise providing the depth value 172. However, the signal processing device 100 may also be arranged for solely providing the replacement depth value 190 when the statistical depth deviation 178 exceeds the statistical image deviation 158.

The statistical depth deviation 178 may be indicative whether the depth value 172 is an outlier amongst the other depth values 174. Similarly, the statistical image deviation 158 may be indicative whether the image value 152 is an outlier amongst the other image values 154. Here, the term outlier may refer to a significant deviation of a value from the mean of other values. For that purpose, a mean of the other values may be calculated. The term outlier may also refer to a deviation that is such that the value is larger than a maximum and/or smaller than a minimum of the other values. For that purpose, the value may be compared to the maximum and/or the minimum of the other values.

The first outlier detector 160 may be configured for establishing the statistical depth deviation 178 by comparing the depth value 172 to the other depth values 174 for establishing if the depth value 172 is a depth outlier. Moreover, the second outlier detector 140 may be configured for establishing the statistical image deviation 158 by comparing the image value 152 to the other image values 154 for establishing if the image value 152 is not an image outlier. The depth value generator 180 may be configured for providing the replacement depth value 190 if the depth value 172 is a depth outlier, i.e., if its statistical depth deviation 178 is relatively large, and if the image value 152 is not an image outlier, i.e., if its statistical image deviation 158 is relatively small.

FIGS. 4, 5 and 6 each show examples of the image value 152, the other image values 154, the corresponding depth value 172 and the other depth values 174. Here, the first spatial neighborhood 176 and the second spatial neighborhood 156 are chosen to be line segments from the 2D depth data 170 and the 2D image data 150, respectively, with each segment having a width of three depth values and three image values, respectively. As such, the horizontal axis depicts a position and the vertical axis a magnitude of each value.

FIG. 4 shows an edge in a line segment from the 2D image data 150, e.g., a transition from a dark object to a bright object. A corresponding edge in the line segment from the 2D depth data 170 indicates that the dark object has a lower depth value, e.g., is further from the camera, than the bright object. Thus, the bright object may be a foreground object, and the dark object may be a background object. The depth value 172 equals or is near to the mean of the other depth values 174. Also, the depth value 172 is neither larger than a maximum of the other depth values 174 nor smaller than a minimum. Hence, the first outlier detector 160 may establish that the depth value 172 is not a depth outlier. Similarly, the image value 152 equals or is near to the mean of the other image values 154, and the image value 152 is neither larger than a maximum of the other image values 154 nor smaller than a minimum. Hence, the second outlier detector 140 may establish that the image value 152 is not an image outlier. Having established that the depth value 172 is not a depth outlier and the image value 152 is not an image outlier, the depth value generator 180 may establish that the depth value 172 is not an artifact and thus may not provide a replacement depth value 190. Instead, the depth value generator 180 may provide the depth value 172, or none at all.

It will be appreciated that the signal processing device 100 may be configured for firstly establishing whether the depth value 172 is a depth outlier, and only when the depth value 172 is a depth outlier, establishing whether the image value 152 is an image outlier. The reason for this may be that when the depth value 172 is not a depth outlier, it is unlikely that the depth value 172 is an artifact, irrespective of the image value 152.

FIG. 5 shows a peak in a line segment from the 2D image data 150, e.g., a cross-section of a thin object in the 2D image data 150. A corresponding peak in the line segment from the 2D depth data 170 indicates that the thin object has a larger depth value 172, e.g., is nearer to the camera, than its surroundings. The depth value 172 is relatively remote from the mean of the other depth values 174. Moreover, the depth value 172 is larger than the maximum of the other depth values 174. Hence, the first outlier detector 160 may establish that the depth value 172 is a depth outlier. Similarly, the image value 152 is relatively remote from the mean of the other image values 154. Moreover, the image value 152 is larger than the maximum of the other image values 154. Hence, the second outlier detector 140 may establish that the image value 152 is an image outlier. Having established that the depth value 172 is a depth outlier and that the image value 152 is an image outlier, the depth value generator 180 may establish that the depth value 172 is not an artifact and thus may not provide a replacement depth value 190. Instead, the depth value generator 180 may provide the depth value 172, or no depth value at all.

A reason for establishing that the depth value 172 is not an artifact may be that when it is established that the image value 152 is an image outlier, this provides an explanation or justification for the depth value 172 also being a depth outlier. Thus, in this case, the depth value 172 may be considered as not being erroneous or an artifact.

FIG. 6 shows an edge in a line segment from the 2D image data 150, e.g., a transition from a dark object to a bright object. However, a corresponding line segment from the 2D depth data 170 shows a peak instead of a transition between depth values. Thus, the depth value 172 is relatively remote from the mean of the other depth values 174. Moreover, the depth value 172 is larger than the maximum of the other depth values 174. Hence, the first outlier detector 160 may establish that the depth value 172 is a depth outlier. However, the image value 152 is equal or near to the mean of the other image values 154, and the image value 152 is neither larger than a maximum of the other image values 154 nor smaller than a minimum. Hence, the second outlier detector 140 may establish that the image value 152 is not an image outlier. Having established that the depth value 172 is a depth outlier and the image value 152 is not an image outlier, the depth value generator 180 may establish that the depth value 172 is an artifact and thus may provide a replacement depth value 190.

It will be appreciated that establishing if the image value 152 is not an image outlier may comprise establishing if the image value 152 is an image outlier, as both configurations may be functional complements. Thus, the second outlier detector 140 may be configured for establishing if the image value 152 is an image outlier by providing a signal to the depth value generator 180. The depth value generator 180 may then establish that the image value 152 is not an image outlier if said signal is not received.

The depth value generator 180 may provide as replacement depth value 190 one of the other depth values 174 in the first spatial neighborhood 176. In particular, the depth value generator 180 may provide a maximum and/or a minimum of the other depth values 174 in the first spatial neighborhood 176. The depth value generator 180 may also generate a replacement depth value 190 from the image value 152 and/or the other image values 154, thus essentially performing a depth map generation process. The depth value generator 180 may also generate a replacement depth value 190 by filtering the depth values, or a subset of the depth values, in the first spatial neighborhood 176 with a spatial filter. Thus, the replacement depth value 190 may be a spatially filtered depth value. The spatial filter may be an interpolation filter for interpolating, i.e., essentially re-generating, the depth value 172 from the other depth values 174. The interpolation filter may be a linear interpolation filter or a non-linear interpolation filter. For example, the interpolation filter may be an edge-preserving interpolation filter. The spatial filter may also be a noise reduction filter for suppressing outliers amongst the depth values. For example, the noise reduction filter may be a rank-order filter, e.g., a median filter.

The depth value generator 180 may also provide as the replacement depth value a mixture, e.g., a weighted average or a so-termed reciprocal mix, of the aforementioned replacement depth values 190 and the depth value 172. The mixture may be determined, e.g., weighted, by a difference in relative size between the statistical depth deviation 178 and the statistical image deviation 158. For example, if the statistical depth deviation 178 exceeds the statistical image deviation 158 by only a small amount, the replacement depth value 190 may comprise a weighted average in which, e.g., a spatially filtered depth value has a small weight, and the depth value 172 has a large weight. Similarly, if the statistical depth deviation 178 exceeds the statistical image deviation 158 by a large amount, the replacement depth value 190 may comprise a weighted average in which the spatially filtered depth value has a large weight, and the depth value 172 has a small weight.

The first spatial neighborhood 176 and the second spatial neighborhood 156 are shown in FIGS. 2 to 6 to both have a similar or identical shape and size. However, the shape and/or the size of both neighborhoods may differ. A reason for this may be that the spatial resolutions of the 2D image data 150 and the 2D depth data 170 differ, and thus, e.g., a smaller size neighborhood may be sufficient for the lower resolution data. Moreover, the characteristics of the 2D image data 150 and the 2D depth data 170 may differ, and thus, a different shape and/or size may be needed for establishing if the depth value 172 is a depth outlier than for establishing if the image value 152 is not an image outlier.

The first spatial neighborhood 176 and the second spatial neighborhood 156 may extend predominantly in a horizontal direction. In particular, the first spatial neighborhood 176 and the second spatial neighborhood 156 may be neighborhoods with a height of one, i.e., consisting of a horizontal line portion of the 2D depth data 170 and the 2D image data 150, respectively. For example, the first spatial neighborhood 176 and the second spatial neighborhood 156 may comprise three, five or seven horizontally adjacent values. Similarly, the first spatial neighborhood 176 and the second spatial neighborhood 156 may comprise values that form a horizontal row, with each of said values having an intermediate value that is not part of the neighborhood. Consequently, the first spatial neighborhood 176 and the second spatial neighborhood 156 may not need to be each formed by a continuous area. Instead, a continuous area may be sub-sampled to form the respective neighborhood.

Figure 7:
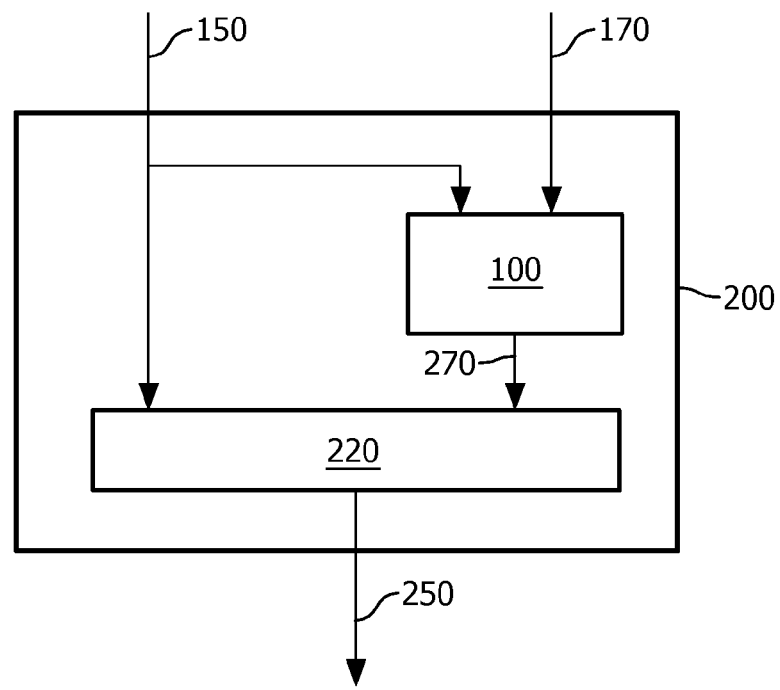
FIG. 7 shows a viewpoint generator comprising the signal processing device.

FIG. 7 shows a viewpoint generator 200 for displacing at least one part of the 2D image data 150 as a function of the 2D depth data 170 to generate further 2D image data 250. The viewpoint generator 200 comprises the signal processing device 100 for pre-processing the 2D depth data 170 prior to performing the viewpoint generation. For that purpose, the signal processing unit 100 generates further 2D depth data 270 from the 2D image data 150 and the 2D depth data 170, and provides the further 2D depth data 270 to a viewpoint generation processor 220. The viewpoint generation processor 220 then uses the further 2D depth data 270 to generate the further 2D image data 250. The further 2D depth data 270 typically comprises the depth values of the 2D depth data 170, with outliers amongst the depth values having been replaced by the signal processing device 100. Thus, instead of directly generating the further 2D image data 250 from the 2D image data 150 and the 2D depth data 170, the viewpoint generator 200 uses the signal processing device 100 to first reduce outliers in the 2D depth data 170 prior to performing the viewpoint generation.

Figure 8:
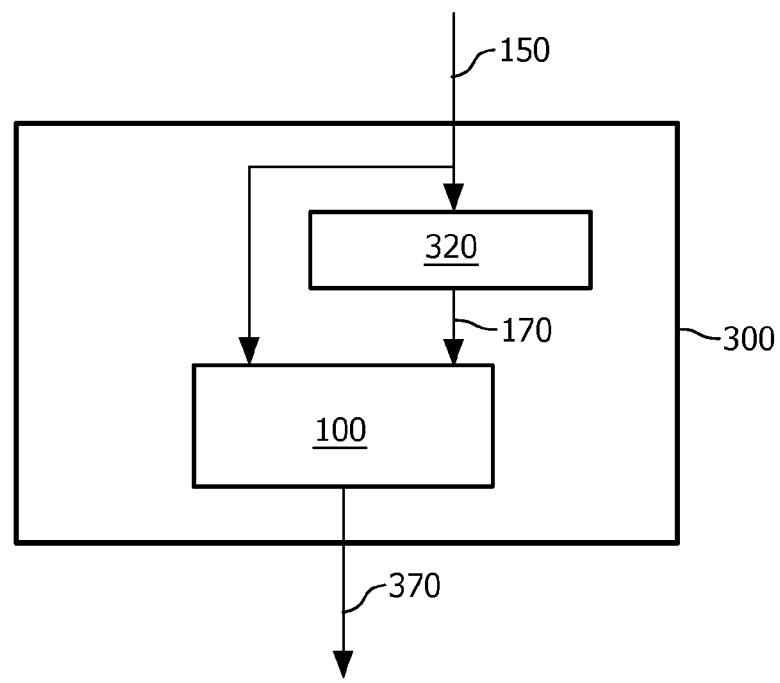
FIG. 8 shows a depth data generator comprising the signal processing device.

FIG. 8 shows a depth data generator 300 for generating the 2D depth data 170 in dependence on the 2D image data 150. For that purpose, the depth data generator 300 comprises a depth data generation processor 320 that receives the 2D image data 150 and generates the 2D depth data 170. The depth data generator 300 also comprises the signal processing device 100 for further processing the 2D depth data 170. For that purpose, the depth data generation processor 320 provides the 2D depth data 170 to the signal processing device 100, which then generates further 2D depth data 370. The further 2D depth data 370 typically comprises the depth values of the 2D depth data 170, with outliers amongst the depth values having been replaced by the signal processing device 100. Thus, the signal processing device 100 is used for post-processing the 2D depth data 170.

Figure 9:
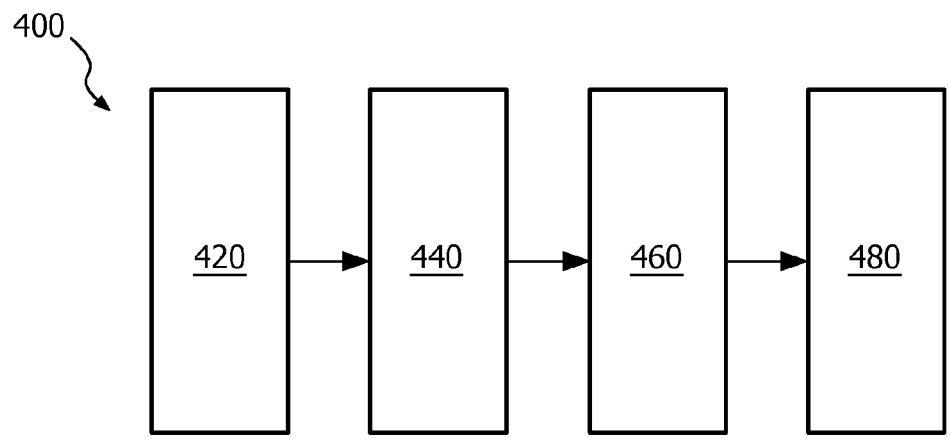
FIG. 9 shows a method for processing depth data.

FIG. 9 shows a method for processing 3D image data, the 3D image data comprising 2D image data and thereto corresponding 2D depth data, and the method comprising receiving 420 the 2D image data and the 2D depth data, establishing 440 a statistical depth deviation of a depth value from other depth values in a first spatial neighborhood of the 2D depth data, establishing 460 a statistical image deviation of an image value from other image values in a second spatial neighborhood of the 2D image data, the depth value representing a depth of the image value, and in dependence on the statistical depth deviation and the statistical image deviation, providing 480 a replacement depth value when the statistical depth deviation exceeds the statistical image deviation, the replacement depth value having a lower statistical depth deviation than the depth value.

Figure 10:
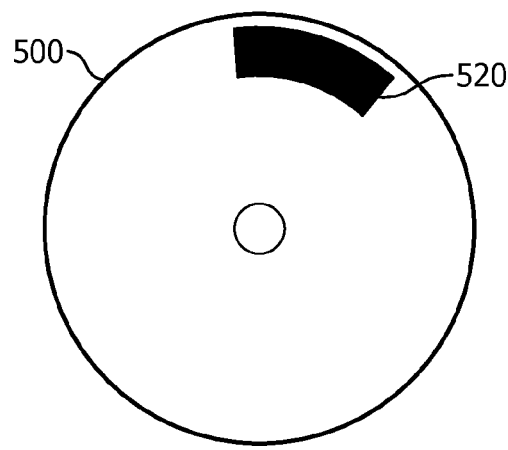
FIG. 10 shows a computer program embodied on a computer readable medium.

FIG. 10 shows a computer readable medium 500 comprising a computer program 520, the computer program 520 comprising instructions for causing a processor system to perform the method 400 as shown in FIG. 9. The computer program 520 may be embodied on the computer readable medium 500 as physical marks or by means of magnetization of the computer readable medium 500. However, any other suitable embodiment is conceivable as well. Furthermore, it will be appreciated that, although the computer readable medium 500 is shown in FIG. 10 as an optical disc, the computer readable medium 500 may be any suitable computer readable medium, such as a hard disk, solid state memory, flash memory, etc., and may be non-recordable or recordable.

It will be appreciated that the present invention may be applied for analyzing depth transitions to detect narrow borders with an incorrect depth. If a depth value is detected that deviates from its surrounding depth values, the image value at a same location may be compared with its surrounding image values. If the image value is an interpolated value between the surrounding image values, i.e., is not an outlier, it may be assumed that the image value is from a blurred object edge, and thus, that the depth value has been erroneously generated from the blurred object edge. A replacement depth value may then be provided by assigning the depth of one of the surrounding depth values to the depth value, and in particular, one of the surrounding depth values that is most associated with the foreground.

A possible implementation of the present invention may be to process the 2D depth data line by line, and compare a depth value with its left and right neighbors, the neighbors being at a distance of one or more pixels. If the depth value is not between its surrounding values, the image value is compared with its left and right neighbors, the neighbors also being at a distance of one or more pixels. If the image value is comparable to its surrounding image values, e.g., based on luminance, chrominance, intensity, hue, saturation or another color characteristic, the depth value is considered as an artifact. As a result, the depth value is set to the maximum of its surrounding depth values, i.e., a replacement depth value is provided having said maximum as depth value.

Another possible implementation of the present invention is to process the 2D depth data by sequentially scanning through a spatial aperture in the 2D depth data to reduce depth outliers in the spatial aperture. The scanning may comprise first horizontally scanning through the spatial aperture, then vertically, and finally diagonally. Another possible implementation is a parallelized implementation, in which the invention is applied to multiple depth values and corresponding image values within the spatial aperture in parallel.

In general, it is noted that when the 2D image data and the 2D depth data is data from a video sequence, the first spatial neighborhood and/or the second spatial neighborhood may also extend temporally, i.e., the other image values and/or the other depth values may comprise image values and/or depth values from a part of the video sequence later or earlier in time. Hence, the signal processing device may establish not only whether the depth value and/or the image value is a spatial outlier, but also if it is a temporal outlier.

It is also noted that the 2D image data may be obtained, or be part of, stereo image data or so-termed multi-view image data. This may occur if, e.g., stereo image data or multi-view image data is used in a depth data generation process to generate the 2D depth data. Hence, the 3D image data may be formed by the generated 2D depth data, and by 2D image data that is obtained from the stereo image data or the multi-view image data.

It will be appreciated that the above description for clarity has described embodiments of the invention with reference to different functional units. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A signal processing device for processing three-dimensional (3D) image data, the 3D image data comprising two-dimensional (2D) image data and thereto corresponding 2D depth data, and the signal processing device comprising:
  an input configured to receive the 2D image data and the 2D depth data;
  a first outlier detector configured to establish a statistical depth deviation of a depth value from other depth values in a first spatial neighborhood of the 2D depth data;
  a second outlier detector configured to establish a statistical image deviation of an image value from other image values in a second spatial neighborhood of the 2D image data, the depth value representing a depth of the image value; and
  a depth value generator configured to, in dependence on the statistical depth deviation and the statistical image deviation, provide a replacement depth value when the statistical depth deviation exceeds the statistical image deviation, the replacement depth value having a lower statistical depth deviation than the depth value.

2. A viewpoint generator configured to displace at least one part of the 2D image data as a function of the 2D depth data to generate further 2D image data, the viewpoint generator comprising the signal processing device according to claim 1.

3. A depth data generator configured to generate the 2D depth data in dependence on the 2D image data, the depth data generator comprising the signal processing device according to claim 1.

4. A signal processing device for processing three-dimensional (3D) image data, the 3D image data comprising two-dimensional (2D) image data and thereto corresponding 2D depth data, and the signal processing device comprising:
  an input configured to receive the 2D image data and the 2D depth data;
  a first outlier detector configured to establish a statistical depth deviation of a depth value from other depth values in a first spatial neighborhood of the 2D depth data;
  a second outlier detector configured to establish a statistical image deviation of an image value from other image values in a second spatial neighborhood of the 2D image data, the depth value representing a depth of the image value; and
  a depth value generator configured to, in dependence on the statistical depth deviation and the statistical image deviation, provide a replacement depth value when the statistical depth deviation exceeds the statistical image deviation, the replacement depth value having a lower statistical depth deviation than the depth value,
  wherein the first outlier detector is configured to establish the statistical depth deviation by comparing the depth value to the other depth values to establish if the depth value is a depth outlier,
  wherein the second outlier detector is configured to establish the statistical image deviation by comparing the image value to the other image values to establish if the image value is not an image outlier, and
  wherein the depth value generator is configured to provide the replacement depth value if the depth value is a depth outlier and if the image value is not an image outlier.

5. The signal processing device according to claim 4, wherein the first outlier detector is configured to:
  compare the depth value to at least one of a maximum and a minimum of the other depth values; and
  establish that the depth value is a depth outlier when the depth value is at least one of larger than the maximum and smaller than the minimum of the other depth values.

6. The signal processing device according to claim 4, wherein the second outlier detector is configured to:
  compare the image value to at least one of a maximum and a minimum of the other image values; and
  establish that the image value is not an image outlier when the image value is at least one of smaller than the maximum and larger than the minimum of the other image values.

7. A signal processing device for processing three-dimensional (3D) image data, the 3D image data comprising two-dimensional (2D) image data and thereto corresponding 2D depth data, and the signal processing device comprising:
  an input configured to receive the 2D image data and the 2D depth data;
  a first outlier detector configured to establish a statistical depth deviation of a depth value from other depth values in a first spatial neighborhood of the 2D depth data;
  a second outlier detector configured to establish a statistical image deviation of an image value from other image values in a second spatial neighborhood of the 2D image data, the depth value representing a depth of the image value; and
  a depth value generator configured to, in dependence on the statistical depth deviation and the statistical image deviation, provide a replacement depth value when the statistical depth deviation exceeds the statistical image deviation, the replacement depth value having a lower statistical depth deviation than the depth value,
  wherein the depth value generator is configured to provide as the replacement depth value one of the other depth values in the first spatial neighborhood.

8. The signal processing device according to claim 7, wherein the depth value generator is configured to provide as the replacement depth value at least one of a maximum and a minimum of the other depth values in the first spatial neighborhood.

9. A signal processing device for processing three-dimensional (3D) image data, the 3D image data comprising two-dimensional (2D) image data and thereto corresponding 2D depth data, and the signal processing device comprising:
an input configured to receive the 2D image data and the 2D depth data;
a first outlier detector configured to establish a statistical depth deviation of a depth value from other depth values in a first spatial neighborhood of the 2D depth data;
a second outlier detector configured to establish a statistical image deviation of an image value from other image values in a second spatial neighborhood of the 2D image data, the depth value representing a depth of the image value; and
a depth value generator configured to, in dependence on the statistical depth deviation and the statistical image deviation, provide a replacement depth value when the statistical depth deviation exceeds the statistical image deviation, the replacement depth value having a lower statistical depth deviation than the depth value,
wherein the depth value generator is configured to apply a spatial filter to the first spatial neighborhood of the 2D depth data to provide as the replacement depth value a spatially filtered depth value.

10. The signal processing device according to claim 9, wherein the spatial filter is a spatial noise reduction filter configured to suppress depth outliers.

11. A signal processing device for processing three-dimensional (3D) image data, the 3D image data comprising two-dimensional (2D) image data and thereto corresponding 2D depth data, and the signal processing device comprising:
an input configured to receive the 2D image data and the 2D depth data;
a first outlier detector configured to establish a statistical depth deviation of a depth value from other depth values in a first spatial neighborhood of the 2D depth data;
a second outlier detector configured to establish a statistical image deviation of an image value from other image values in a second spatial neighborhood of the 2D image data, the depth value representing a depth of the image value; and
a depth value generator configured to, in dependence on the statistical depth deviation and the statistical image deviation, provide a replacement depth value when the statistical depth deviation exceeds the statistical image deviation, the replacement depth value having a lower statistical depth deviation than the depth value,
wherein the first spatial neighborhood and the second spatial neighborhood extend predominantly in a horizontal direction.

12. The signal processing device according to claim 11, wherein the first spatial neighborhood comprises a horizontal line portion of the 2D depth data, and the second spatial neighborhood comprises a corresponding horizontal line portion of the 2D image data.

13. A method for processing three-dimensional (3D) image data, the 3D image data comprising two-dimensional (2D) image data and thereto corresponding 2D depth data, and the method comprising acts of:
receiving by an input the 2D image data and the 2D depth data;
establishing via a first outlier detector a statistical depth deviation of a depth value from other depth values in a first spatial neighborhood of the 2D depth data;
establishing via a second outlier detector a statistical image deviation of an image value from other image values in a second spatial neighborhood of the 2D image data, the depth value representing a depth of the image value; and
in dependence on the statistical depth deviation and the statistical image deviation, providing via a depth value generator a replacement depth value when the statistical depth deviation exceeds the statistical image deviation, the replacement depth value having a lower statistical depth deviation than the depth value.

14. The method according to claim 13, wherein:
the first outlier detector is configured to establish the statistical depth deviation by comparing the depth value to the other depth values to establish if the depth value is a depth outlier;
the second outlier detector is configured to establish the statistical image deviation by comparing the image value to the other image values to establish if the image value is not an image outlier; and
the depth value generator is configured to provide the replacement depth value if the depth value is a depth outlier and if the image value is not an image outlier.

15. The method according to claim 13, wherein the depth value generator is configured to provide as the replacement depth value one of the other depth values in the first spatial neighborhood.

16. The method according to claim 13, wherein the depth value generator is configured to apply a spatial filter to the first spatial neighborhood of the 2D depth data to provide as the replacement depth value a spatially filtered depth value.

17. The method according to claim 13, wherein the first spatial neighborhood and the second spatial neighborhood extend predominantly in a horizontal direction.

18. A computer program stored on a non-transitory computer readable medium, the computer program comprising instructions for causing a processor system to perform acts of:
causing receiving by an input two-dimensional (2D) image data and 2D depth data;
causing establishing by a first outlier detector a statistical depth deviation of a depth value from other depth values in a first spatial neighborhood of the 2D depth data;
causing establishing by a second outlier detector a statistical image deviation of an image value from other image values in a second spatial neighborhood of the 2D image data, the depth value representing a depth of the image value; and
causing, in dependence on the statistical depth deviation and the statistical image deviation, providing by a depth value generator a replacement depth value when the statistical depth deviation exceeds the statistical image deviation, the replacement depth value having a lower statistical depth deviation than the depth value.

19. The computer program stored on the non-transitory computer readable medium according to claim 18, wherein:
the first outlier detector is configured to establish the statistical depth deviation by comparing the depth value to the other depth values to establish if the depth value is a depth outlier;
the second outlier detector is configured to establish the statistical image deviation by comparing the image value to the other image values to establish if the image value is not an image outlier; and
the depth value generator is configured to provide the replacement depth value if the depth value is a depth outlier and if the image value is not an image outlier.

20. The computer program stored on the non-transitory computer readable medium according to claim 18, wherein the depth value generator is configured to provide as the replacement depth value one of the other depth values in the first spatial neighborhood.

\* \* \* \* \*